United States Patent
Bath

[11] 3,951,900
[45] Apr. 20, 1976

[54] FIRE-RETARDANT ADHESIVE
[75] Inventor: Wesley W. Bath, Williamsville, N.Y.
[73] Assignee: National Gypsum Company, Buffalo, N.Y.
[22] Filed: Dec. 26, 1973
[21] Appl. No.: 427,688

[52] U.S. Cl. .................. 260/29.7 S; 106/15 FP; 260/9; 260/DIG. 24; 260/29.7 H; 260/29.7 SE; 260/29.7 P; 260/29.7 AT; 260/29.7 PT
[51] Int. Cl.² ................. C08L 9/08; C09K 3/28
[58] Field of Search ............... 260/DIG. 24, 29.7 S, 260/9; 106/15 FP

[56] References Cited
UNITED STATES PATENTS

| | | | |
|---|---|---|---|
| 3,043,790 | 7/1962 | Sanders | 260/29.7 S |
| 3,240,736 | 3/1966 | Beckwith | 260/29.7 S |
| 3,822,229 | 7/1974 | McMaster | 260/29.7 S |

OTHER PUBLICATIONS

Blackley, *High Polymer Latices* pp. 29, 283–284, (Applied Sci. Pub. London, 1966).
Chaberek et al., *Organic Sequestering Agents* (John Wiley & Sons 1959 pp. 311–313, 402, 405).
Martel et al., *Chem. of Metal Chelate Cpds* (Prentice-Hall 1952 pp. 194, 511,542).
Dwyer et al., *Chelating Agents & Metal Chelates* (Academic Press 1964 pp. 298–299).
*Materials & Cpd Matls for Rubber* p. 270 (Rubber World, 1968).
Blackley, *High Polymer Latices* pp. 107, 111, 680–682, 752 (Applied Sci. Pub. London, 1966).
Noble, *Latex in Industry* ged., p. 224 (Rubber Age, 1953).

*Primary Examiner*—Murray Tillman
*Assistant Examiner*—T. DeBenedictis, Sr.
*Attorney, Agent, or Firm*—Robert F. Hause

[57] ABSTRACT

A stable adhesive composition containing primarily a styrene-butadiene binder, calcium sulfate dihydrate as a combination filler and fire-retardant, a nonionic wetting agent and a non-phosphate sequestering agent.

2 Claims, No Drawings

FIRE-RETARDANT ADHESIVE

This invention relates to an adhesive composition particularly adapted for carpet making in adhering jute backing to carpet fibers.

Carboxylated styrene-butadiene latex emulsion has been combined with aluminum oxide trihydrate fire-retardant filler and used as a carpet adhesive for some time. Calcium sulfate dihydrate, commonly known as gypsum, has the same ability to give off water in a fire as does aluminum oxide trihydrate.

Attempts to replace the aluminum oxide trihydrate with the lower cost gypsum, in rug adhesives, have been unsuccessful because its addition resulted in the coagulation of the latex emulsion.

It is an object of the present invention to provide a way to replace aluminum oxide trihydrate with gypsum in rug adhesives, without coagulation of the latex emulsion. It is a further object of the invention to provide a novel low cost fire-retardant rug adhesive.

EXAMPLE I

According to the present invention, a novel carpet adhesive is formed by combining the following:

|  | Parts by Weight |
|---|---|
| Styrene-butadiene latex aqueous emulsion (50% solids) | 35.0 |
| Alkylaryl polyether alcohol nonionic surface active agent (70% solution in water) | 0.5 |
| Gypsum powder | 64.5 |
|  | 100.0 |

The nonionic surface active agent is added to the latex emulsion and water and mixed therewith prior to the adding of the gypsum. The thus modified latex emulsion is now stabilized relative to the addition thereto of gypsum, and consequently when the gypsum powder is added there is no coagulation of the latex emulsion.

The preferred ratio of the weight of latex solids to nonionic surface active agent, exclusive of the water of the solution, is about 40:1. The preferred ratio of the gypsum powder to the latex solids, by weight, is about 4:1. The amount of free water to be added is open to choice dependent on the thickness of the solution desired in the use of the adhesive.

The styrene-butadiene latex which has been commonly used in the rug adhesive art is a carboxylated styrene-butadiene latex, such as General Tire and Rubber Co. Gen-Flo 67, however any other styrene-butadiene latex may be used instead. The carboxylated styrene-butadiene latex has been preferred because of its generally greater tackiness and adhesiveness.

Any nonionic surface active agent may be used to make the styrene-butadiene latex stable during addition of the gypsum powder. The nonionic alkylaryl polyether alcohol used in the examples was Rohm and Haas Triton X-405, which provides this stability for at least 30 days. Some nonionic surface active agents would cause the resultant adhesive to have a tendency to wet carpet fibers to an extent which is greater than commonly desired, however they will nevertheless maintain the latex stable during addition of gypsum powder.

The gypsum powder is preferably finely ground natural gypsum, ground to a fineness such that substantially 80% will pass through a U.S. Standard 325 mesh screen, however equivalent synthetic gypsum has been found to be equally suitable in a fire-retardant rug adhesive.

EXAMPLE II

Further advantages may be attained by a formulation as follows:

|  | Parts by Weight |
|---|---|
| Carboxylated styrene-butadiene latex aqueous emulsion (50% solids) | 32.30 |
| Alkylaryl polyether alcohol nonionic surface active agent (70% solution in water) | 0.47 |
| Gypsum powder | 56.50 |
| Sodium glucoheptonate | 0.34 |
| Sodium polyacrylate thickener (10% solids) | 0.32 |
| Tri-butyl phosphate defoamer | 0.07 |
| Free Water | 10.00 |
|  | 100.00 |

The sodium glucoheptonate, a non-phosphate sequestering agent, is thoroughly mixed with the gypsum powder to facilitate dispersing the gypsum powder into the latex, decreasing substantially the tendency of the gypsum powder to form lumps which can be difficult to break and disperse. A suitable source is Glucoquest A-C, manufactured by Philadelphia Quartz, Inc.

The sodium polyacrylate thickener is used to increase viscosity for use of the adhesive by a roll coating application.

A defoamer such as tri-butyl phosphate may be used in minimizing the foaming of the adhesive during mixing and use, however any other commercial defoamer can be expected to be effective in lessening any tendency toward foaming.

Although an explanation of the reason that the addition of a nonionic surface active agent prevents the coagulation of the latex on addition of gypsum cannot be made with certainty, it is believed that without this addition of nonionic surface active agent, the Ca ions in the gypsum-latex mixture attract latex stabilizing agents present in the latex when added without this addition of nonionic surface active agent, but with the addition of the nonionic surface active agent, this surface active agent can satisfy this attraction by the Ca ions, avoiding the breaking of the latex emulsion.

On completion of mixing of the formulations of Examples I and II, the adhesive produced has been found to have a shelf, as required, of at least 30 days. When applied to the backing and fibers in carpet making, and dried to perform its adhering function, the adhesive contributes to retard the spread of fire in the final carpet product. A common test for fire-retardancy, passed when adhesive of the invention was used, consists of igniting a methenamine tablet which has been placed on either the face or the back of a carpet. This test is failed if the flames spread as far as 4 inches in any direction within 2 minutes.

EXAMPLE III

As examples of further reductions in cost of the adhesive, some of the gypsum may be replaced by a limestone filler, and the percentage of binder present can be reduced, as follows:

|  | Parts by Weight |
|---|---|
| Styrene-butadiene latex emulsion (50% solids) | 25.00 |
| Alkylaryl polyether alcohol nonionic surface active agent (70% solution) | 0.37 |
| Gypsum powder | 28.25 |
| Limestone whiting | 28.25 |
| Sodium glucoheptanate | 0.17 |
| Sodium polyacrylate thickener | 0.32 |
| Tri-butyl phosphate defoamer | 0.07 |
| Free Water | 17.57 |
|  | 100.00 |

The ratio of latex to filler can be increased to any degree desired, however increases beyond the preferred ratios result in increasing the adhesive cost at the sacrifice of the degree of fire-retardancy, with only minimal increases in strength.

Having completed a detailed disclosure of the preferred embodiments of my invention, so that others may practice the same, I contemplate that variations may be made without departing from the essence of the invention or the scope of the appended claims.

I claim:
1. A wet adhesive composition comprising a styrene-butadiene latex aqueous emulsion, a finely ground calcium sulfate dihydrate fire-retardant filler, a minor quantity of sodium glucoheptonate sequestering agent, a minor quantity of sodium polyacrylate thickener, and a minor quantity of a nonionic surface active agent, said nonionic surface active agent being present in a ratio of about 1 part for each 100 parts styrene-butadiene latex aqueous emulsion.

2. A wet adhesive composition as defined in claim 1 having the following formulation:

|  | Parts by Weight | |
|---|---|---|
| Carboxylated styrene-butadiene latex aqueous emulsion (50% solids) | about | 32.30 |
| Alkylaryl polyether alcohol nonionic surface active agent (70% solution in water) | about | .47 |
| Calcium sulfate dihydrate powder | about | 56.50 |
| Sodium glucoheptonate sequestering agent [Non-phosphate] | about | 0.34 |
| Sodium polyacrylate thickener (10% solids) | about | 0.32 |
| Defoamer | about | 0.07 |
| Free Water | about | 10.00 |

* * * * *